United States Patent
Troesch

(10) Patent No.: US 11,975,942 B2
(45) Date of Patent: May 7, 2024

(54) HYBRID FLOOR TERMINAL FOR AN ELEVATOR SYSTEM

(71) Applicant: INVENTIO AG, Hergiswil (CH)

(72) Inventor: Florian Troesch, Zurich (CH)

(73) Assignee: Inventio AG, Hergiswil (CH)

( * ) Notice: Subject to any disclaimer, the term of this patent is extended or adjusted under 35 U.S.C. 154(b) by 1456 days.

(21) Appl. No.: 16/332,872

(22) PCT Filed: Sep. 12, 2017

(86) PCT No.: PCT/EP2017/072925
§ 371 (c)(1),
(2) Date: Mar. 13, 2019

(87) PCT Pub. No.: WO2018/050654
PCT Pub. Date: Mar. 22, 2018

(65) Prior Publication Data
US 2019/0359448 A1 Nov. 28, 2019

(30) Foreign Application Priority Data
Sep. 13, 2016 (EP) ..................................... 16188435

(51) Int. Cl.
*B66B 1/46* (2006.01)
*H04W 88/08* (2009.01)

(52) U.S. Cl.
CPC .............. *B66B 1/468* (2013.01); *B66B 1/463* (2013.01); *H04W 88/085* (2013.01); *B66B 2201/4607* (2013.01)

(58) Field of Classification Search
CPC . B66B 1/468; B66B 1/463; B66B 2201/4607; H04W 88/085
See application file for complete search history.

(56) References Cited

U.S. PATENT DOCUMENTS

| 7,764,978 | B1 | 7/2010 | West |
| 8,200,273 | B2 | 6/2012 | Mcfarland |
| 2012/0267203 | A1 | 10/2012 | Friedli et al. |

FOREIGN PATENT DOCUMENTS

| CN | 101092220 A | 12/2007 |
| CN | 104444662 A | 3/2015 |
| CN | 105858381 A | 8/2016 |
| EP | 1319624 A1 | 6/2003 |
| EP | 1943175 A1 | 7/2008 |
| EP | 1768922 B1 | 7/2009 |
| EP | 2544981 A1 | 1/2013 |
| JP | H02239078 A | 9/1990 |

(Continued)

*Primary Examiner* — Jeffrey Donels
(74) *Attorney, Agent, or Firm* — Wiggin and Dana LLP

(57) ABSTRACT

The invention relates to a floor terminal for an elevator system in a building, comprising an elevator operating terminal and a wireless network device. The elevator operating terminal has a user interface for calling an elevator cabin, an elevator data interface for communicating data with an elevator controller, and a processing device which is coupled to the user interface and the elevator data interface. The wireless network device has a wireless transceiver for communicating with a communication device, a data interface for communicating data with the network access point, and a processing device coupled to the wireless transceiver and the data interface. By using such a floor terminal, a building can be equipped with additional functionality with relatively little installation effort during a redevelopment process.

9 Claims, 2 Drawing Sheets

(56) References Cited

FOREIGN PATENT DOCUMENTS

| WO | 2007040532 A1 | 4/2007 |
|----|---------------|--------|
| WO | 2011110748 A1 | 9/2011 |
| WO | 2015049186 A1 | 4/2015 |
| WO | 2015177020 A1 | 11/2015 |

HYBRID FLOOR TERMINAL FOR AN ELEVATOR SYSTEM

CROSS-REFERENCE TO RELATED APPLICATIONS

This application is the national phase application under 35 U.S.C. § 371 claiming the benefit of priority based on International Patent Application No. PCT/EP2017/072925, filed on Sep. 12, 2017, which claims the benefit of priority based on European Patent Application No. 16188435.8, filed on Sep. 13, 2016. The contents of each of these applications are herein incorporated by reference.

FIELD OF THE INVENTION

The technology described here relates generally to elevator systems and their operation in buildings. Embodiments of the technology relate in particular to a floor terminal for an elevator system, a communication system having a floor terminal of this kind, and a method for installing a communication system of this kind in a building in which an elevator system is provided.

BACKGROUND OF THE INVENTION

In buildings that have elevator systems, elevator operating terminals are arranged on the individual floors, by means of which terminals a user can call an elevator. In a known elevator system, an elevator operating terminal has up/down buttons in order to enter the desired direction of travel. In another elevator system, the user can enter the destination floor on an elevator operating terminal already on the floor. For this purpose, the elevator operating terminal can have a keyboard, a touch sensitive screen and/or a data acquisition device (e.g. in the form of an RFID card reader known from EP 0699617 B1).

In terms of their functionality, the elevator operating terminals of these known elevator systems are restricted to the call entry. However, modern buildings require additional functionality. There is therefore a need for additional technology in order to be able to better meet the requirements of modern buildings.

SUMMARY OF THE INVENTION

One aspect of technology of this kind relates to a communication system in a building having an elevator system, in which an elevator controller, in response to a call of a user, moves an elevator cabin in an elevator shaft from one floor to another floor. The communication system comprises a plurality of floor terminals arranged in the building and a network that is designed for communication between the floor terminals and a network access point and for communication between the floor terminals and the elevator controller. Each floor terminal has an elevator operating terminal and a radio network device. The elevator operating terminal has a user interface for calling an elevator cabin, an elevator data interface coupled to the elevator control network for communicating data with the elevator controller, and a processing device which is coupled to the user interface and the elevator data interface. The radio network device has a radio transceiver for communicating with a communication device present on a floor, a data interface coupled to the data network for communicating data with the network access point, and a processing device which is coupled to the radio transceiver and the data interface.

Another aspect relates to a floor terminal for an elevator system in a building. The floor terminal comprises an elevator operating terminal and a radio network device. The elevator operating terminal has a user interface for calling an elevator cabin, an elevator data interface for communicating data with an elevator controller, and a processing device which is coupled to the user interface and the elevator data interface. The radio network device has a radio transceiver for communicating with a communication device present on a floor, a data interface for communicating data with the network access point, and a processing device which is coupled to the radio transceiver and the data interface.

An additional aspect relates to a method for installing a communication system in a building in which an elevator system is provided. The floor terminals are installed at specified locations in the building, each floor terminal having an elevator operating terminal and a radio network device. The elevator operating terminal has an elevator data interface for communicating data with an elevator controller and the radio network device has a data interface for communicating data with a network access point. A network is installed in an elevator shaft, and each data interface and each elevator data interface of a floor terminal is connected to the network.

By means of the technology described here, a floor terminal is created which not only has the functionality of an elevator operating terminal, but also the functionality of a radio network device. The radio network device facilitates, on each floor, radio communication between the radio network device and a communication device present on a floor. Since the radio network device is connected to a data network, it generally facilitates communication between the communication devices via the data network, for example in conjunction with building management tasks and/or access to the Internet.

In one embodiment of the communication system, the network comprises a data network and an elevator control network. In one embodiment, at least the data network is arranged at least in part in the elevator shaft. Depending on the application, the network can also be arranged substantially in the elevator shaft. Since the elevator shaft is accessible to authorized persons, the network or the data network can be installed at a low degree of technical and financial expenditure. The data network can then be installed, for example, when the elevator control network is also installed in the elevator shaft.

Installing the data network in the elevator shaft is particularly advantageous when modernizing the building. An example of modernization of this kind is converting the elevator system from a conventional up/down call controller to a destination call controller. Since in this case the elevator operating terminals are also renewed, the floor terminals can be installed at the desired locations on the floors in accordance with the technology described here, and the data network can be laid in the elevator shaft. The additional functionality of a radio network device is therefore achieved without the costly laying of the data network in the building outside the elevator shaft.

In one embodiment, the data network is physically separated from the elevator control network. This means, for example, that each of these networks has individual lines or an individual wiring system, such that data is transmitted in the data network separately from data being transmitted in the elevator control network. Each network can therefore be individually designed or optimized for the desired application, for example with respect to the type of line or cable or the kind of data transmission or the speed thereof. In another embodiment, the data network and the elevator control network are combined in one network.

In one embodiment, the radio network device is a WLAN (WiFi) router which is used as an interface between the data network and the radio network. In this case it is advantageous that WLAN routers are generally known and are used accordingly often. Communication devices which are provided for communicating with WLAN routers are therefore also often used, for example in mobile communication devices (e.g. mobile phones, smartphones, tablet PCs) for access to the Internet.

The technology offers flexibility in terms of the type of communication devices present in the building. The communication device can be part of an electronic building component, for example an intercom system, an electronic locking system, an access control system, a video surveillance system or an alarm system. The communication device can also be part of a mobile communication device (e.g. smartphone, tablet PC) that is for example temporarily located on a floor.

There is also flexibility in terms of the communication via the data network. The network access point assigned to the data network selectively facilitates communication between a communication device on a floor and a building device or the communication network external to the building. In accordance with the possibilities for the communication devices, a building device can be part of an electronic building component, for example an intercom system, an electronic locking system, an access control system, a video surveillance system or an alarm system.

There is also freedom of design in terms of the arrangement of the floor terminals. In one embodiment, a floor terminal has a housing in which the elevator operating terminal and the radio network device are arranged. The housing can be arranged on a building wall, on the ground of a floor (e.g. as a standing structure) or on a part of the elevator system which is accessible to a user on a floor (e.g. on the frame of a shaft door). Depending on the design of the housing, only the functionality of an elevator terminal may be recognizable to a user (e.g. only a touchscreen or a keyboard is visible), the functionality of a radio network device remaining hidden from said user.

Various aspects of the improved technology are described in greater detail in the following with reference to embodiments in conjunction with the drawings. In the figures the same elements have the same reference numerals. In the drawings:

DETAILED DESCRIPTION OF EMBODIMENTS OF THE INVENTION

Figure 1:
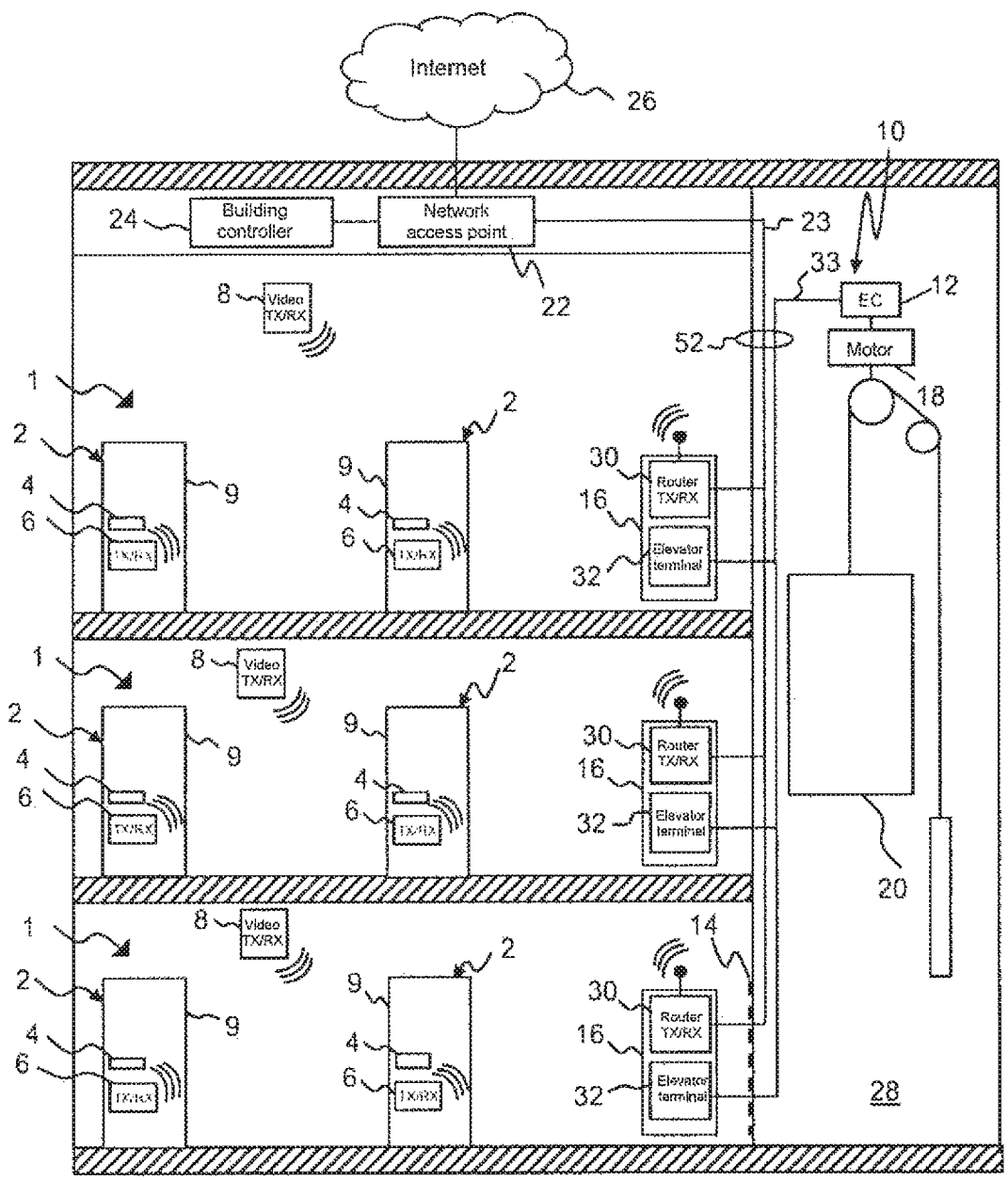
FIG. 1 is a schematic view of an exemplary situation in a building having a plurality of floors and an elevator system.

FIG. 1 is a schematic view of an exemplary situation in a building that has a plurality of floors 1 which are served by an elevator system 10. For reasons of depiction, FIG. 1 of the elevator system 10 only shows one elevator controller 12, one drive motor 18 and one elevator cabin 20 that can be moved in a shaft 28, in the following also referred to as cabin 20. A person skilled in the art will recognize that the elevator system 10 can also be designed differently, for example as an elevator system having a plurality of cabins 20 in a shaft or as a hydraulic elevator. The shaft 28 is partitioned off on each floor 1 in a known manner by a shaft door 14 (in FIG. 1, the shaft door 14 is only indicated on the lowest floor). A plurality of entrances 2 (e.g. doors 9, each comprising a door handle/door latch 4) are shown on each floor 1, which entrances allow access to apartments, offices or other zones or spaces, for example. A person skilled in the art will recognize that an entrance 2 may also be one of possibly a plurality of building entrances, garage driveways and/or property entrances/driveways.

In the embodiment shown, a floor terminal 16 is arranged on each floor 1, which terminal is part of a communication system in the building and is coupled to a network 52. A person skilled in the art will recognize that a plurality of floor terminals 16 can also be arranged on one floor 1. In FIG. 1, the floor terminals 16 are arranged in the vicinity of the relevant shaft doors 14 (e.g. on a building wall or standing on the ground). However, the floor terminals can also be arranged at a distance from said doors at other locations on the floors 1 or be integrated into door frames of the shaft doors 14. As shown in FIG. 1, each floor terminal 16 contains an elevator operating terminal 32 and a radio network device 30 (e.g. a WLAN router, as described in conjunction with FIG. 2). Each elevator operating terminal 32 and each radio network device 30 is coupled to the network 52, the network 52 comprising an elevator control network 33 and a data network 23 in the embodiment shown. In FIG. 1, each elevator operating terminal 32 is coupled to the elevator control network 33 to which the elevator controller 12 is also coupled, and each radio network device 30 is coupled to the data network 23 that has a network access point 22. One or more building control devices 24 can in turn be coupled to the network access point.

The network 52 can be designed differently, for example according to building-specific requirements. In one embodiment, the elevator control network 33 and the data network 23 are designed so as to be separated from one another, such that data is transmitted in the data network separately from data being transmitted in the elevator control network. In another embodiment, the elevator control network 33 and the data network 23 are combined in the network 52; for example, they are physically substantially unseparated. The network 52 can, for example, be a data bus system.

In the situation shown in FIG. 1, the technology described here can be applied in an advantageous manner. Summed up briefly and by way of example, the floor terminal 16 is used as an operating terminal for the elevator system 10 and as a wireless access point to the data network 23 for communication devices 6, 8 present on the floors 1. The access point and the data network 23 can be designed for data transmission rates in the Gbit/s range. Due to the stated double function, the floor terminal 16 is effectively a hybrid floor terminal. A user can enter a desired trip, as in known elevator systems, by means of the elevator operating terminal 32 integrated in the floor terminal 16. Depending on the design of the elevator system 10, the user can enter a desired direction of travel (up/down) or a desired destination floor. The elevator operating terminal 32 confirms the entered desired trip to the user. The radio network device 30 that is likewise integrated in the floor terminal 16 communicates with the communication devices 6, 8 present on a floor 1 by means of radio connections and produces communication connections to the data network 23.

The elevator control network 33 is used for bidirectional communication between the individual elevator operating terminals 30 and the elevator controller 12. A call entered by a user on the elevator operating terminal 32 is thus transmitted via the elevator control network 33 to the elevator controller 12. If, for example, the call is a destination call, the elevator controller 12 assigns a cabin 20 to the destination call and sends a control command to the elevator operating terminal 30 via the elevator control network 33 in order to inform the user of the assigned cabin 20, for example by means of a user interface of the elevator operating terminal 30.

In one embodiment, the elevator control network 33 consists of a wired data bus system. The elevator control network 33 extends in the building within the shaft 28 in a vertical direction. The communication between the elevator controller 12 and the elevator operating devices 32 occurs when a data bus system of this kind is used in accordance with a protocol for wired communication, for example the LonTalk protocol if the data bus system is based on the LON (local operating network) standard. A person skilled in the art will also recognize that, alternatively to a data bus system, each elevator operating device 32 can be connected to the elevator controller 12 via a separate line.

The data network 23 is a wired network that extends in the building in a vertical direction likewise within the shaft 28. In one embodiment, the data network 23 is based on Ethernet technology, the data being transmitted in accordance with the Ethernet protocol. Depending on which type of line (e.g. twisted pair cable or glass fiber cable) is used for the data network 23, data transmission rates of a few Mbits/s up to several Gbit/s are possible.

A building control device 24 can be directly connected to the data network 23 or, as shown in FIG. 1, indirectly connected via the network access point 22. In the embodiment shown in FIG. 1, the network access point 22 also allows access to a communication network 26 external to the building, for example to the Internet. A building control device 24 coupled to the data network 23 can be part of a building management system which, for example, performs tasks that are relevant to the security in the building. For example, the building control device 24 can be part of an intercom system, a video surveillance system, an access control system, an alarm system (e.g. for intruder or fire alarm systems) or another building automation system (e.g. for heating, ventilation and air conditioning). For an access control system, the building control device 24 can contain a database in which the profiles of people who have access to the building are saved.

In FIG. 1, a communication device 6 is present on each of the entrances 2, each communication device 6 having a radio transceiver, i.e. a transmitting and receiving device for radio signals (indicated in FIG. 1 by "TX/RX"). The communication device 6 can be arranged on the door 9 or in the zone or apartment behind said door, it also being possible to arrange a plurality of communication devices 6 in the apartment or zone. The communication device can also be part of a mobile communication device (e.g. smartphone, tablet PC) that is for example temporarily located on a floor.

In one embodiment, the communication device 6 is part of an electronic locking system which, for example controlled by an access control system, locks or unlocks the door 9 as required. In another embodiment, the communication device 6 is part of an intercom system, which is suitable for voice and image transmission, for example. In the embodiment shown, a further communication device 8 is optionally arranged on each floor 1 outside the zones, spaces or apartments, for example on a floor landing or corridor. This communication device 8 can, in one embodiment, be part of a video surveillance device. Each communication device 8 of the video surveillance device has a radio transmitter and a radio receiver; in FIG. 1 this is indicated by "Video TX/RX." A person skilled in the art will recognize that the embodiments mentioned can also be implemented in combination in the building.

If the communication device 6 is part of an electronic locking system, it can be arranged in conjunction with a door 9, as shown in FIG. 1. The electric energy required for operating the communication device 6 or other electronic components of the locking system (e.g. a data acquisition device) that are arranged on the door 9 can be provided for example by an (internal) battery or a connection to an external power supply (e.g. a mains supply external to the building).

When a person wishes to be admitted at an entrance 2, the data acquisition device captures data of the person, e.g. a PIN code entered by the person or an electronic or optical code read from a data carrier. If the data are captured, the communication device 6 communicates with the radio network device 30 in order to be able to check the access authorizations of the person, e.g. by means of the building control device 24. In one embodiment, the building control device 24 checks whether the received code is assigned to an access-authorized person in the database of the device. If this is the case and the person therefore is authorized access, the building control device 24 initiates the unlocking of the relevant door 9 in order to allow the person to enter. Further details of the data acquisition device are described elsewhere in conjunction with FIG. 2.

Figure 2:
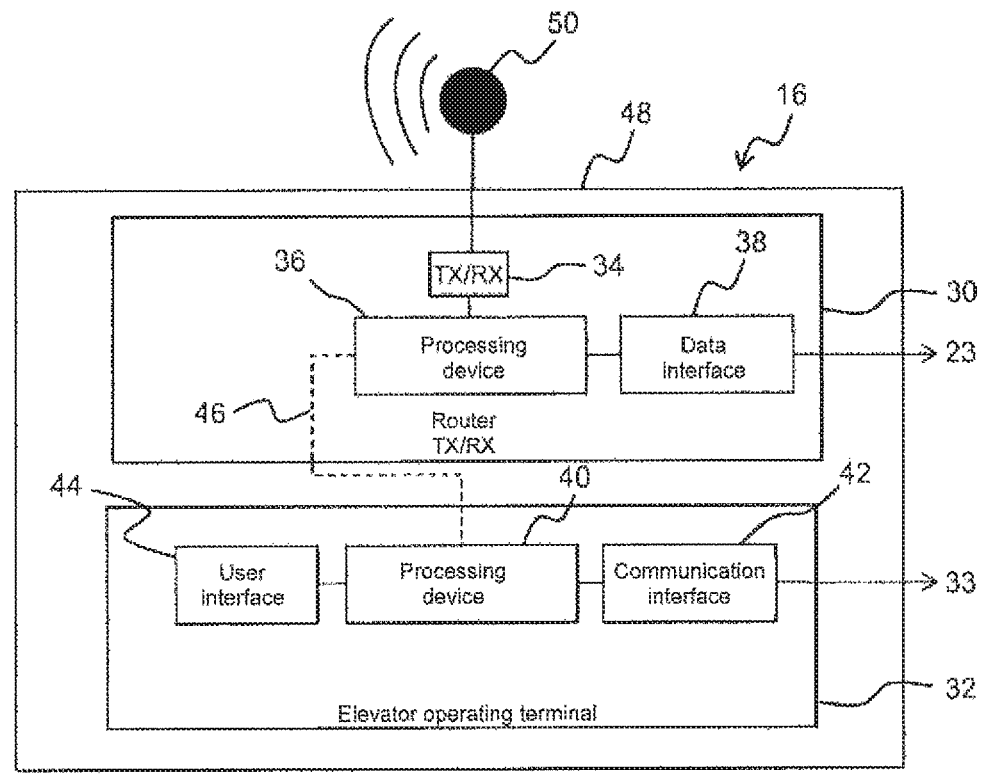
FIG. 2 is a schematic view of an embodiment of a floor terminal.

FIG. 2 is a schematic view of an embodiment of a floor terminal 16, details of the elevator operating terminal 30 and the radio network device 30 being shown. The elevator operating terminal 30 and the radio network device 30 are arranged in a housing 48. An antenna 50 of the radio network device 30, shown in FIG. 2, can be arranged completely in the housing 48 or outside the housing 48. The housing 48 can be designed in different ways in order to meet, for example, the requirements for user-friendliness and design. Correspondingly, the housing 48 can be provided for mounting on a building wall or on the ground. For mounting on the ground, the housing 48 can be designed for example as a free-standing and column-shaped structure. As a result of the radio network device 30 being accommodated in the housing 48, the stated double function of the floor terminal 16 remains hidden from an observer. In another embodiment, the housing 48 can be arranged on a door frame of the elevator door 14. In a further embodiment, the floor terminal 16 can be integrated, together with or without the housing 48, in a door frame.

The elevator operating terminal 30 has a user interface 44, a processing device 40 and an elevator data interface 42, the user interface 44 and the elevator data interface 42 being connected to the processing device 40. The elevator data interface 42 can also be connected to the elevator control network 33. From the perspective of a user who wishes to travel from one floor 1 to another floor 1, the user interface 44 is used to enable him to enter a call and to confirm the call to him, e.g. by showing the identification of the assigned cabin 20 and/or by activating a pressed button such that this lights up, for example. In order to fulfill these functions, the user interface 44 can have different components, for example a keyboard, a touch-sensitive screen (touchscreen), a data acquisition device or a combination of these components.

The data acquisition device can comprise a reading device which can capture data on the basis of different known technologies. The reading device can, for example, read data from magnetic cards, chip cards, RFID cards or mobile electronic devices (e.g. mobile phones, smartphones, tablets), or capture data from optical codes (barcodes, QR codes, color codes) which are printed on different carrier materials or are presented on displays of mobile electronic devices (e.g. mobile phones, smartphones, tablets). In another embodiment, the reading device can comprise an apparatus for capturing and/or identifying biometric parameters (e.g. samples of fingertips, palm prints or eyes (iris) or voice characteristics). The data acquisition device can, for example, be used on the door 2 irrespective of the type of reading device.

If, for example, radio frequency identification (RFID) technology is used in the reading device, the reading device is an RFID reader which receives data from an RFID card placed within radio range. The data, for example comprising an identification code, are stored in a data storage unit of the RFID card. The radio frequency used by the RFID reader and the RFID card is 125 kHz, 13.56 MHz or 2.45 GHz, for example. However, if optical technology is used, the reading device is an optical reading device (e.g. a camera or a scanner) which captures the sample of an optical code which is printed on a carrier material or displayed on an electronic device. Exemplary technology for generating and capturing an optical color code shown on an electronic device is described in WO 2015/049186.

In order to enter a call, the user brings e.g. the RFID card into radio range, and the RFID reader of the user interface 44 receives the read data (identification code) which the processing device 40 forwards to the elevator controller 12. Depending on the design of the elevator system 10, the identification code can be used to check whether the user is authorized to travel to the desired floor. If the user has this authorization and the elevator controller 12 has assigned a cabin 20 to the call, the processing device 40 actuates the user interface 44 in order to inform the user of the assigned cabin 20.

The radio network device 30 has a data interface 38, a processing device 36 and a radio transceiver 34, i.e. a transmitting/receiving device for radio signals, the data interface 44 and the radio transceiver 34 being connected to the processing device 36. The data interface 38 can also be connected to the data network 23. Depending on the design of the floor terminal 16, the processing device 36 of the radio network device 30 can be coupled to the processing device 40 of the elevator operating terminal 32. In FIG. 2, this is depicted by a connection 46 shown as a dashed line.

The radio transceiver 34 generates a local radio network on the floor 1, which local radio network is used to communicate with the communication devices 6, 8 installed there. The radio network device 30 can therefore be regarded as a (network) router which couples the radio network on a floor 1 to the data network 23. If different network protocols (e.g. Ethernet, ATM) are used in the radio network and in the data network 23, the processing device 36 adapts these to one another. Known radio networks are, for example, Zigbee in accordance with the standard IEEE 802.15.4, Wireless Local Area Network (WLAN) in accordance with standard IEEE 802.11, Worldwide Interoperability for Microwave Access (WIMAX) in accordance with standard IEEE 802.16 having a range of several 100 meters to several 10's of kilometers. The radio frequency used by the radio network in the case of a WLAN, for example, is in the 2.4 GHz band or in the 5.0 GHz band, and in the case of WIMAX is in the 10 to 66 GHz band.

If the radio network is a WLAN (WiFi) radio network, it can be used by mobile devices (e.g. mobile phones, smartphones, tablet PCs). Mobile devices of this kind have communication devices which are usually designed for WLAN networks. The mobile devices can, for example, receive access to the Internet from a floor 1 or a zone or space of the floor 1 via the radio network and the data network 23.

An application-specific software (also known as an "app") can also be installed on a mobile device, which software facilitates the operation of the elevator system 10. A user can enter a destination call using this app, for example. In one design of the communication system, the app communicates with the radio network device 30 via the radio network. The processing device 36 thereof recognizes that the call is a destination call, and forwards the call to the processing device 40 of the elevator operating terminal 32 via the connection line 46.

Again with reference to FIG. 1, in the embodiment shown the doors 2 allow access to the apartments, offices or other access-restricted zones. A person skilled in the art will recognize that, in other embodiments, gates, turnstiles, revolving doors or other barriers can be used to allow or block access. In further embodiments, barriers of this kind can be supplemented or replaced by electronic surveillance devices, for example light gates, motion detectors or optical devices (3D cameras, video cameras). Depending on the building, alternatives of this kind can also be used in combination. These devices can also be provided with a communication device 6, 8 in order to communicate with the building control device 24 by means of radio connections and the radio network device 30.

In FIG. 1, the building control device 24 is installed in the building. A person skilled in the art will recognize that the building control device 24 can also be installed outside the building, for example in a remotely arranged service center. In a case of this kind, the communication between the building control device 24 and the different units and apparatuses in the building occurs via a communication network 26 (e.g. the Internet and/or a WAN).

Figure 3:
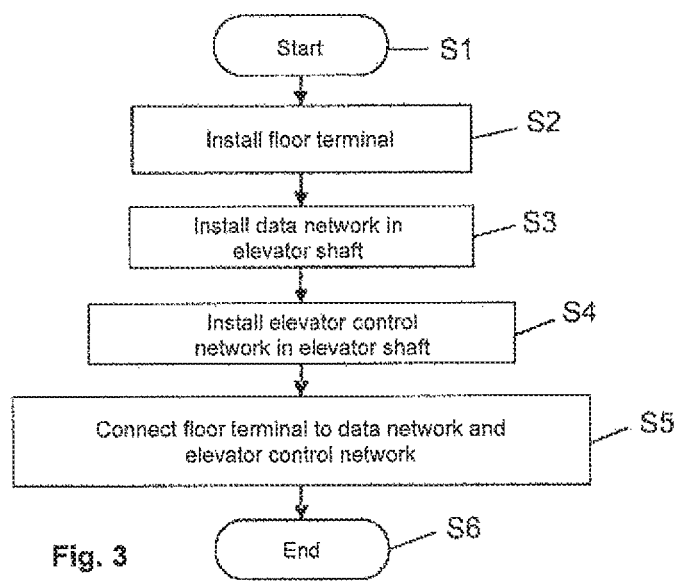
FIG. 3 is an exemplary representation of a method for installing a communication system in a building.

With the understanding of the fundamental system components described above and the functionalities thereof, a description of an exemplary method for installing a communication system in a building in which an elevator system 10 is provided is given below with reference to FIG. 3. The communication system can, for example, be installed during the time in which the building is being constructed, or in the course of modernizing the building if for example the elevator system 10 is modernized. As mentioned above, during modernization the elevator system 10 can be converted from a conventional up/down call controller to a destination call controller. The conversion of the elevator system 10 can therefore be used to provide further functionality in the building at a relatively low degree of design effort.

An exemplary procedure in a conversion of this kind is described in EP 1319624 B1, for example. Here, it is specified, in particular on the electrical signal level, which devices are used and in what order. The following description of the method does not mention this aspect. The method begins in a step S1 and ends in a step S6.

In a step S2, the floor terminals 16 are installed at specified locations in the building. In one embodiment, a floor terminal 16 is installed on each floor 1. In another embodiment, a plurality of floor terminals 16 can be installed on one or more floors. A person skilled in the art will recognize that the floor terminals 16 are connected to a power supply (e.g. to the mains supply of the building) during installation.

In a step S3, the data network 23 is installed in the elevator shaft 28, and in a step S4 the elevator control network 33 is installed in the elevator shaft 28. The installation in the elevator shaft 28 is particularly advantageous for the laying of electrical cables in a vertical direction. A person skilled in the art will recognize that the data network 23 and the elevator control network 33 can be installed at the same time or in reverse order.

In a step S5, the floor terminals 16 are connected to the data network 23 and the elevator control network 33. In this case, the data network 23 is connected to the data interface 38 of the radio network device 30 and the communication interface 42 of the elevator operating terminal 32 is connected to the elevator control network 33.

The invention claimed is:

1. A communication system in a building having comprising an elevator system, in which an elevator controller, in response to a call of a user, moves an elevator cabin in an elevator shaft from one floor to another floor, the communication system comprising:
    a plurality of floor terminals arranged in the building; and
    a network configured for communication between the floor terminals and a network access point and for communication between the floor terminals and the elevator controller, wherein the network comprises a data network configured for communication between the floor terminals and the network access point, and an elevator control network configured for communication between the floor terminals and the elevator controller, wherein at least the data network is arranged at least in part in the elevator shaft,
    wherein each floor terminal comprises an elevator operating terminal and a radio network device, wherein the elevator operating terminal comprises a user interface for calling an elevator cabin, an elevator data interface for communicating data with the elevator controller using the elevator control network, and a processing device which is coupled to the user interface and the elevator data interface, and
    wherein the radio network device comprises a radio transceiver for communicating with a communication device present on a floor, a data interface for communicating data with the network access point by means of the data network, and a processing device which is coupled to the radio transceiver and the data interface.

2. The communication system according to claim 1 wherein at least the data network is separated from the elevator control network such that data is transmitted in the data network separately from data being transmitted in the elevator control network.

3. The communication system according to claim 1, wherein the data network and the elevator control network are combined to form a data bus system.

4. The communication system according to claim 1 wherein at least one communication device is part of an electronic building component, wherein the electronic building component is an intercom system, an electronic locking system, a video surveillance system, or an alarm system.

5. The communication system according to claim 1 wherein the radio network device on a floor generates a WLAN radio network, wherein a communication device on the floor communicates with the radio network device on the floor via the WLAN radio network.

6. The communication system according to claim 1 wherein the network access point is arranged in the building and is connected to a building control device or to a communication network external to the building in order to selectively facilitate communication between the communication device and the building control device or the communication network external to the building.

7. A method for installing a communication system in a building in which an elevator system is provided, the method comprising:
    installing floor terminals at specified locations in the building, wherein each floor terminal comprises an elevator operating terminal and a radio network device wherein the elevator operating terminal comprises an elevator data interface for communicating data with an elevator controller and wherein the radio network device comprises a data interface for communicating data with a network access point;
    installing a network in an elevator shaft, wherein installing the network comprises installing a data network and installing an elevator control network in the elevator shaft;
    connecting the data interface of each floor terminal to the network; and
    connecting the elevator data interface of each floor terminal to the network.

8. The method according to claim 7, further comprising installing a communication device on the floors, wherein each communication device is provided for radio communication with the radio network device.

9. The method according to claim 7, in which the data network and the elevator control network are installed as networks separated from one another such that data is transmitted in the data network separately from data being transmitted in the elevator control network.

* * * * *